Figure 1A:
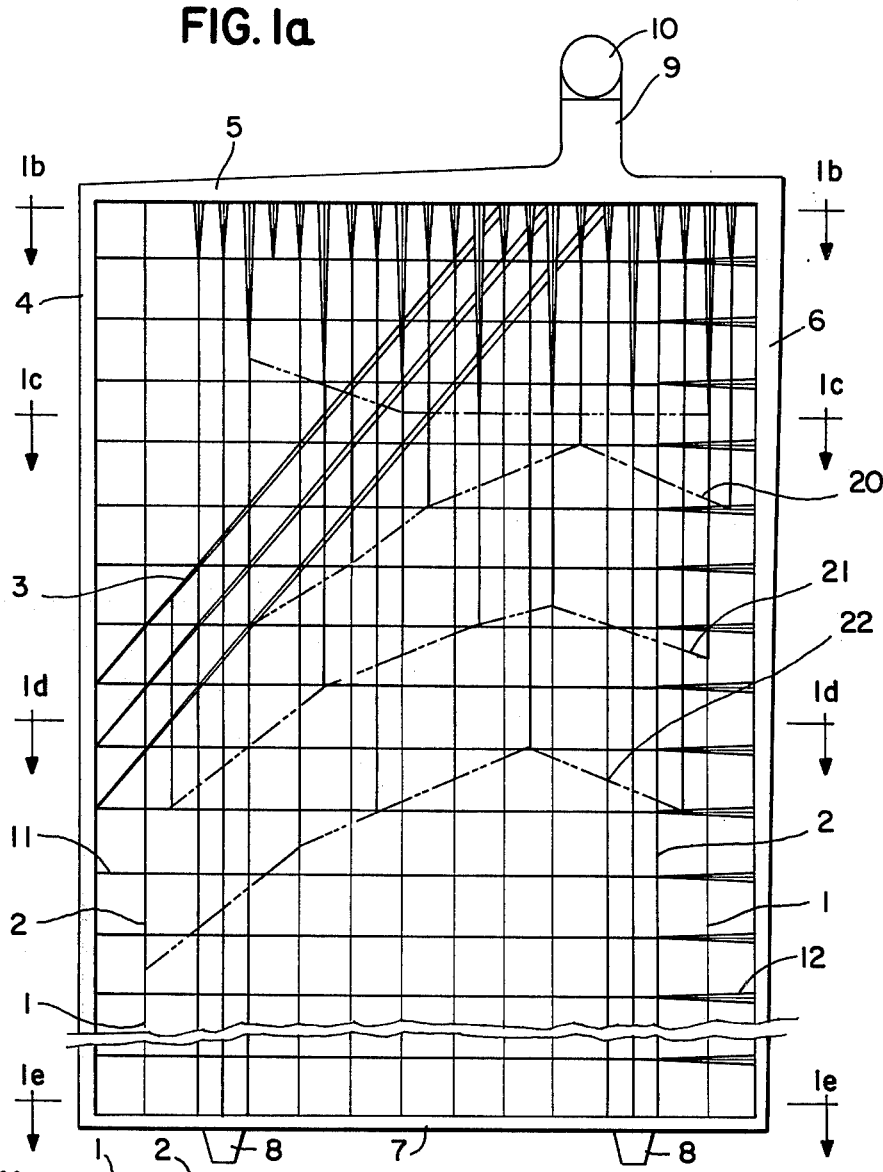
Figure 1B:
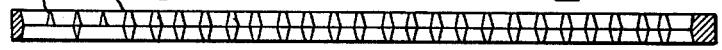
Figure 1C:
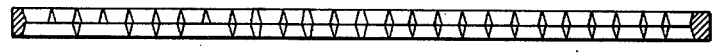
Figure 1D:
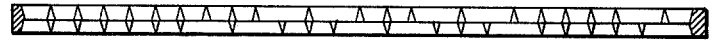
Figure 1E:
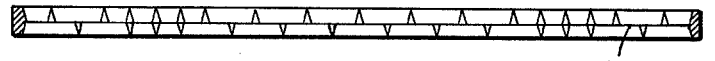

United States Patent [19]

Brinkmann et al.

[11] 3,959,015
[45] May 25, 1976

[54] PLATE GRID FOR LEAD STORAGE BATTERIES

[75] Inventors: Jürgen Brinkmann, Hagen; Gerwin Trippe, Gevelsberg; Willi Heissman, Nachrodt, all of Germany

[73] Assignee: Varta Batterie Aktiengesellschaft, Hannover, Germany

[22] Filed: Oct. 18, 1974

[21] Appl. No.: 516,122

[30] Foreign Application Priority Data

Dec. 21, 1973 Germany............................ 2363759

[52] U.S. Cl.................................... 136/37; 136/41
[51] Int. Cl.²........................................ H01M 4/72
[58] Field of Search ............................... 136/36–67; 29/2

[56] References Cited
UNITED STATES PATENTS

| | | | |
|---|---|---|---|
| 1,199,741 | 9/1916 | Deike..................................... | 136/38 |
| 1,608,469 | 11/1926 | Daniel.................................... | 136/36 |
| 2,064,324 | 12/1936 | Schnaubelt........................... | 136/38 |
| 2,625,574 | 1/1953 | Fuller..................................... | 136/36 |
| 2,716,146 | 8/1955 | Raney............................... | 136/38 X |
| 3,117,893 | 1/1964 | Sundberg............................. | 136/51 |

*Primary Examiner*—John H. Mack
*Assistant Examiner*—C. F. LeFevour
*Attorney, Agent, or Firm*—Weiser, Stapler & Spivak

[57] ABSTRACT

The vertical rods of the battery plate grid are formed partly of whole rods and partly of half rods. The steps at which transitions from whole to half rods take place are positioned to optimize current flow patterns.

14 Claims, 7 Drawing Figures

PLATE GRID FOR LEAD STORAGE BATTERIES

This invention relates to a plate grid for lead storage batteries with rods which are alternately displaced laterally relative to each other.

Every grid construction represents a compromise between the following requirements:
1. Optimization of the electrical characteristics.
2. Simplicity and inexpensiveness of grid mold manufacture.
3. Inexpensiveness and reliability of production.
4. Shock resistance of the battery.

Optimizing computations indicate that it is desirable to linearly increase the cross-section of the grid rods in the direction of current flow. Thus German Auslegeschrift No. 1028180 teaches that, in order to match the cross-sections of the grid rods and of the frame to the current to be taken off, the cross-section of these current take-off elements should increase in the direction of the plate lug. However, such a grid is not suitable for mass production using the casting method, because the requirements concerning manufacture of the casting mold and easy castability cannot be met.

Accordingly, it is an object of the invention to overcome the disadvantages of known grid plates, and provide a grid plate which is easily castable, which has the requisite mechanical strength, and in which the variation in current density, partial voltage drop and overall voltage drop across the grid approximate as closely as possible their theoretically achievable values.

This, and other objects which will appear, are achieved in accordance with the invention by forming the vertically extending grid rods partly as half rods and partly as whole rods.

Figure 2:
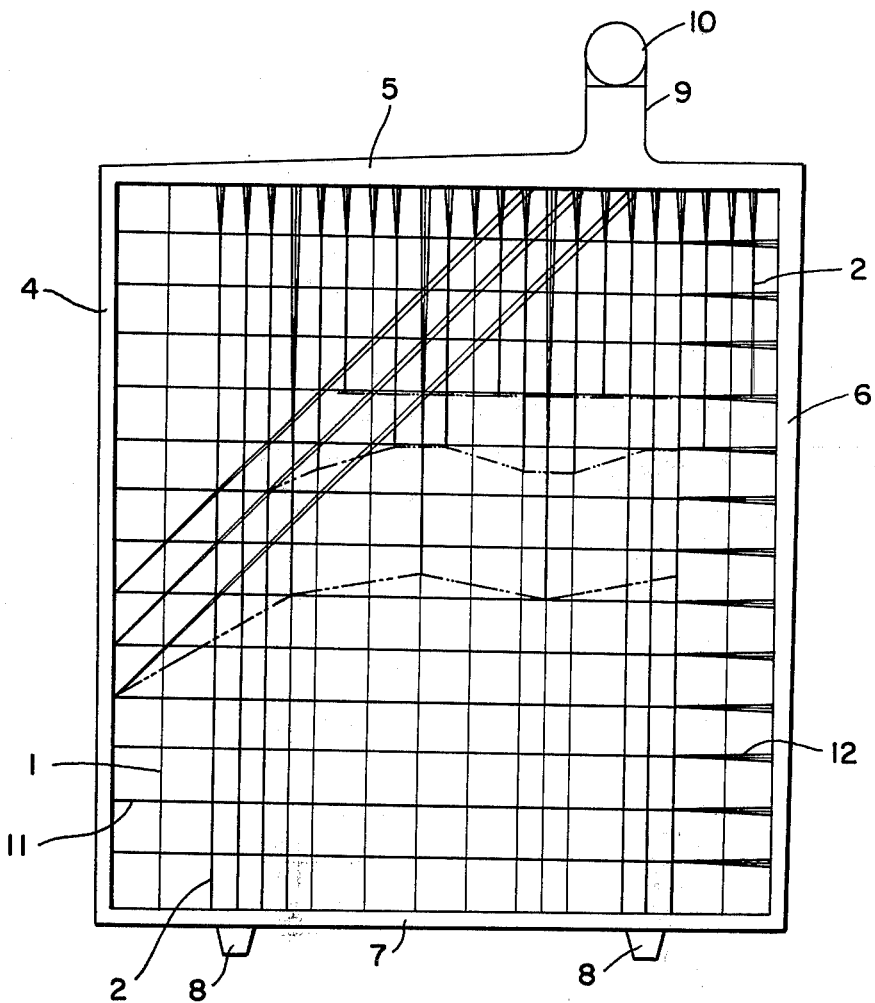
Figure 3:
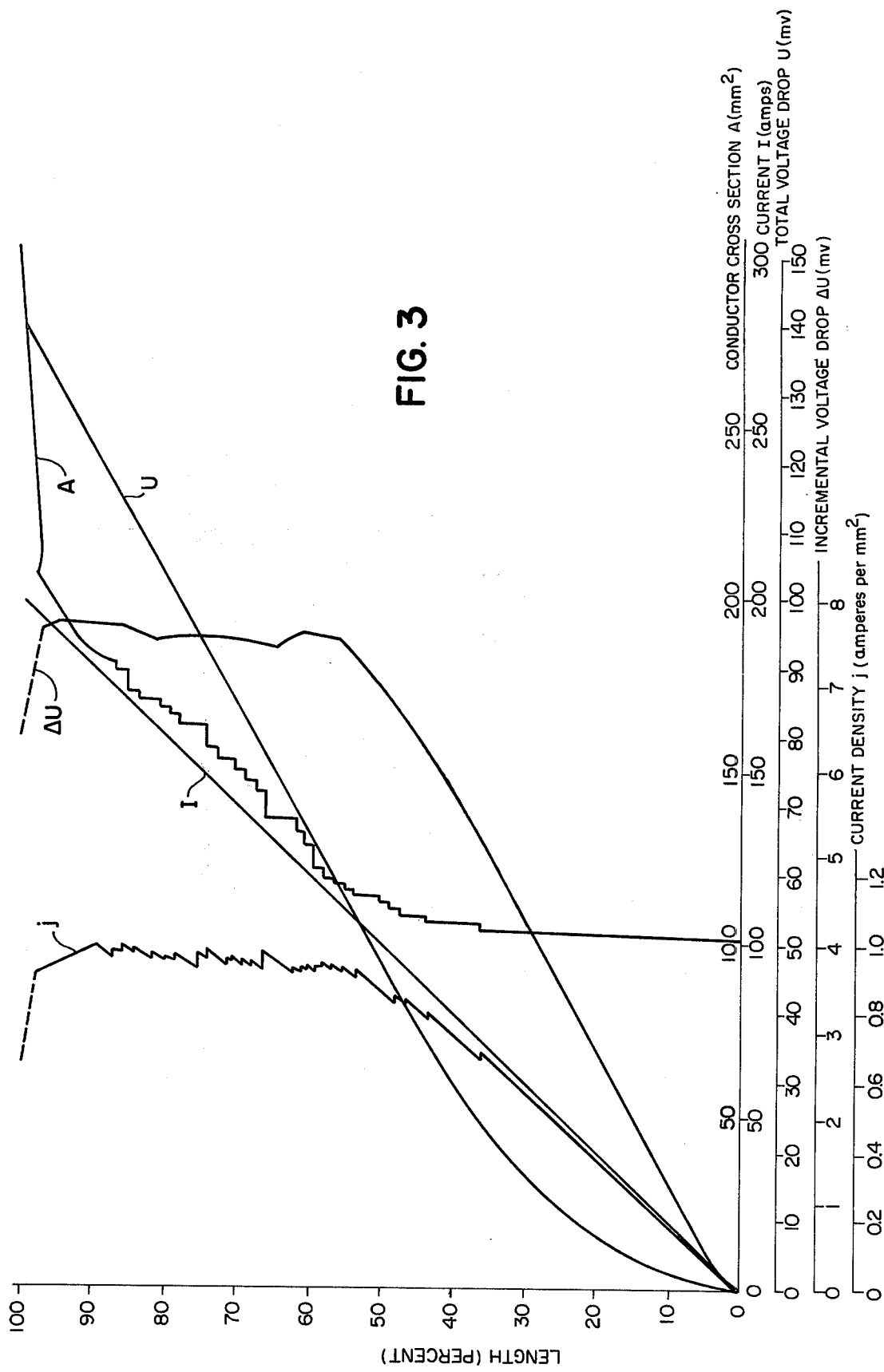

For further details, reference may be had to the discussion which follows in the light of the accompanying drawings, wherein FIG. 1a shows in diagrammatic elevation a rectangular grid plate embodying the invention;

FIGS. 1b through 1e, respectively, show cross-sections taken through the grid of FIG. 1 along lines 1b—1b through 1e—1e;

FIG. 2 shows also in diagrammatic elevation a square grid plate embodying the invention; and FIG. 3 shows the principal electric characteristics of an embodiment of the invention.

Referring to FIG. 1a, there is shown a rectangular grid frame formed of vertical members 4, 6 and horizontal members 5, 7 terminating in plate lug 9 leading to pole-bridge 10. Plate rests 8 are provided at the bottom of the frame. The frame encloses vertical grid rods, different longitudinal portions of which are designated by reference numerals 1 and 2, respectively. These vertical rods are intersected by horizontal rods, different longitudinal portions of which are designated 11 and 12, respectively. In addition, there are a few diagonal grid rods 3.

By considering the elevation shown in FIG. 1a, together with the cross-sectional views of FIGS. 1b through 1e, it becomes apparent that all of these grid rods exhibit variations in thickness along their length. There are two kinds of variations. One is a gradual thinning of the rod cross-section. The other is an abrupt transition on one side of which there is a whole rod, while on the other side there is only a half rod. As shown in FIGS. 1a through 1e, the transitions between the upper whole and lower half rod portions 2 and 1, respectively, follow a family of curves 20, 21 and 22 (FIG. 1a) of generally parabolic shape, open towards the bottom, and having apices generally located beneath pole bridge 10.

Adjacent half-rod portions 1 starting at any given parabolic curve are preferably laterally displaced from each other, alternating between half-rod portions on one side of the plane of symmetry 23 (See FIG. 1e) of the grid frame and half-rod portions on the other side of that plane of symmetry. This serves a variety of purposes. For example, the undulating paste mass configuration which results yields a larger interface between grid and mass, leading to better mass adhesion. Also more uniform mechanical forces are developed during pasting and more troublefree filling of the grid is achieved.

Adjacent transitions between whole rods 2 and half rods 1 along any particular parabola are preferably uniformly spaced from each other in the horizontal direction. Moreover, the endpoints of whole-rod portions 2 terminating at consecutively higher parabolic curves are respectively shifted by one compartment in the direction of the apices of these curves.

In a square grid plate embodying the invention, such as shown in FIG. 2 to which reference may now be had, the apices of the individual parabolic curves are somewhat horizontally displaced relative to the pole bridge and those of the different vertically displaced parabolic curves (shown by the different dot-dash lines) are vertically aligned with one another. For reasons connected with the produceability of the grid, and also to give it greater strength below the plate lug 9, vertical rod 2a in FIG. 2 is carried as a whole rod to the point shown in that figure. This gives the two parabolic curves the appearance of having downward inflections, but conceptually they retain their downwardly open parabolic form, similarly to curves 20 to 22 of FIG. 1a.

In accordance with the invention, the thickness of whole rods 2 diminishes, starting from the upper edge 5 of the plate over at least one grid compartment.

Also in accordance with the invention, there extend from the upper plate edge 5 a plurality of diagonal rods 3 which join individual intersections of the grid compartments and continue all the way to the lateral plate edge 4. Preferably, the thickness of diagonal rods 3 also diminishes starting from the upper plate edge.

In a preferred embodiment of the invention, as shown in FIGS. 1a and 2, those rods which are directly above the plate rests 8 are entirely in the form of whole rods 2.

If plate lug 9 is positioned in the middle of the upper edge 5 of the grid plate, then it is desirable that the cross-sections of side members 4, 6 of the plate frame increase in the directions of the plate lug. On the other hand, if plate lug 9 is close to one of frame side members 4, 6, then in accordance with the invention the cross-section of that side member 4, 6 diminishes from top to bottom.

In either case, the horizontal rods extending from the thinning side members 4, 6 of the plate frame can include portions 12 of diminishing thickness and portions 11 of uniform thickness.

The grid has the following distinctive electrical characteristics.

The lead cross-section is generally greater in the direction of current flow than perpendicularly to the current flow direction. As is particularly discernible in the lower portion of the grid, this results from the fact that grid compartments are bigger in the direction of grid height for a given conductor cross-section than in the direction of grid width (a grid compartment is a rectangle with its long dimension parallel to the grid height). This contrasts with prior grids which generally have square compartments.

The conductor cross-section in the direction of current flow increases progressively in the upper portions of the grid. This results from the fact that, at a predetermined height, half rods become whole rods (thereby doubling the rod cross-section), and at a predetermined height, the rods become conical. In those portions the rod cross-section increases linearly.

The stepwise increase in cross-section of the individual rods, through transition from half to whole rods, is provided in accordance with the invention because it is conducive to improved production of the grid casting form. From the electrical standpoint, a rod of extremely small cross-section would be desirable at the foot of the grid. On the other hand, from the standpoint of casting technology at least a certain minimum cross-section must be maintained. For this reason the grid rods are made with uniform cross-section up to a predetermined height. Optimization calculations show that, from a predetermined height on up, a linearly increasing cross-section is desirable. However, in practice this cannot be achieved within the production capabilities of casting forms. The same result, namely a grid-cross-section which increases linearly from a predetermined height on up, is achievable for the grid as a whole by proceeding according to the invention, namely by positioning the rod steps (transitions from half to whole rods) at various heights.

The magnitude and position of this step (transition from half to whole rods) is so chosen that the current density remains substantially constant from a predetermined grid height on up. As is well known, a conductor exhibits minimum voltage drop when the current density is constant over its entire length.

These relationships are further explained by means of FIG. 3, which corresponds to a structure such as shown in FIG. 1. In FIG. 3, various characteristics are shown as a function of grid height (length).

1. The curve designated I shows the variation in current flowing in the grid from bottom to top and indicates that this current rises linearly from the bottom grid rest to the plate lug.

2. The curve designated A shows the variation in conductor cross-section. As shown in that curve, up to about fifty percent of full grid height this cross-section is substantially constant due to production technology considerations. In contrast, from fifty percent of full grid height on up, the grid cross-section increases essentially linearly in small steps.

3. The curve designated $\Delta U$ shows the incremental voltage drop. This incremental voltage drop increases substantially linearly in the lower portion of the grid (up to about 50 percent of its full height). On the other hand, from fifty percent of full grid height on up, the voltage drop is essentially constant.

4. The curve designated j represents the current density. Essentially the same comments apply to it as to the voltage drop shown in curve $\Delta U$ and discussed in numbered paragraph 3, above.

5. The total voltage drop is shown in curve U. It follows a quadratic function in the lower portion of the plate, while being essentially linear above fifty percent of full plate height.

In accordance with the invention, the ideal variation of current density, incremental voltage drop, and total voltage drop can be closely approximated. Only the step-like character of the grid, and the resulting steps in current density and voltage drops, represent concessions to the produceability of the grid casting mold. Likewise, the fixed cross-section in the lower portion of the grid represents a concession to ready castability of the grid. However, neither of these concessions causes the grid characteristics to depart significantly from the ideal.

The object of any grid construction is to provide equal electrical resistivity from every point at a given height of the grid up to the lug. Moreover, this should be as low as possible (as a practical matter, the height contours of a grid are defined by the horizontally extending transverse rods of the grid).

This basic objective presupposes that, in taking off the current over the entire width of the lug, the steps (transitions from half to whole rods) are always positioned symmetrically with respect to the longitudinal grid axis. Since, in practice, the current is taken off at the upper edge of the grid near one side by means of an excentrically attached lug, the above-mentioned objective is satisfied in accordance with the invention by positioning the steps in the grid diagonally relative to the lug.

In addition, it has proven highly advantageous for the satisfaction of said objective, to place a few diagonal rods in the upper portion of the grid, on the side facing away from the lug. For reasons of production technology, and for reasons of good mass retention, these diagonal rods are so placed that they always traverse the intersections of rectangular grid compartments.

In addition to the result described above, the diagonal rods provide another advantage. For an equivalent lead weight, the diagonal rod offers only about half the electrical resistance of a rod which first extends vertically from the same point and then, after reaching a predetermined height in the grid, extends horizontally up to the diagonal rod. Thus, the diagonal rods appreciably reduce the losses in this portion of the grid.

The presence of these diagonal rods also reduces the necessity for thickening the vertical grid rods in the area of the grid located to their upper left. This accounts, in FIG. 1a, for example, for the shortening of the conical portions in that area, and for the use of half rods extending up into that area (see FIGS. 1b through 1e).

A further means for attaining the objective stated above involves positioning the grid rod steps in the vertical half rods in such a way that, in the grid compartment to the left of a perpendicular passing through the grid plate lug, the step in the rod is immediately to the right of a whole rod. Conversely, in the right-hand portion of the grid, the step is immediately to the left of a whole rod. From another viewpoint, the following can be said with respect to this arrangement:

When a step causes current diversion from a whole rod, the current so diverted flows through a transverse rod, always in the direction of the perpendicular passing through the plate lug. As a result, the losses in the grid attributable to transverse currents are also kept to a minimum.

Still another advantage of the grid construction according to the invention resides in the fact that rods located directly above plate rests 8 remain whole rods along their entire lengths, all the way to the bottom of the grid. This provides, on the one hand, mechanical reinforcement of the grid, which is particularly desirable when it is subject to shocks. On the other hand, these regions of thickened conductor cross section serve as current concentrators.

A further advantage of a construction according to the invention resides in that, across almost the entire width of the grid beneath the lug, the vertical rods are of pronounced conical shape over at least one grid compartment.

This produces the following results.

Due to the differences between the mass of lead in the grid itself and in the lug support, respectively, solidification of the lead used to cause considerable constriction of the rod at its junction with the lug support. This disadvantage is overcome by the conical shape of almost all the rods, where they join the lug support. Because cross-section constriction has thus been averted, no additional resistance is introduced at these junctions. For the same reasons, shocks no longer cause tearing of the rods from the lug support.

A further advantage of the construction in accordance with the invention stems from the fact that individual rods are noticeably conical below the plate lug, to a distance of about five grid compartments. As a result, forces transmitted in response to shocks through the lug to the lug support, and thence to the grid network, are transferred relatively uniformly and deep into that network. This prevents grid cracks within the upper portion of the grid, which used to occur frequently in response to shocks.

For well known reasons it is not practical to cast large grids in their longitudinal directions. Only casting in the transverse direction is feasible. The transverse rods therefore have the task, on the one hand, of retaining the active mass and, on the other hand, of distributing the liquid material during casting over the entire grid surface. For the electrical performance of the grid the transverse rods have no material significance. Consequently, one objective of good grid construction is to keep both the number and the cross-section of the transverse rods as small as possible. It has therefore proven to be very advantageous to make the transverse rods which end at the grid frame on the casting side with conical shape over several rod spaces. Because of this, satisfactory formation of the grid network was possible even though the cross-sections of the transverse rods were kept at a minimum.

The various specific features of the grids discussed above provide two significant improvements:

1. For a given weight of lead, the grid has minimum voltage drop across the grid rods.
2. For a given voltage drop the weight of the grid is at a minimum.

Thus, the voltage drop of a grid according to the invention was able to be reduced to 140 millivolts, compared to a conventional grid of the same lead weight. This represents a 39% improvement. This improvement in voltage drop leads not only to improvement in the output voltage of the battery, but also to equalization of the current density on the plate surface. This is known to produce a significant increase in the load capacity of the battery in high current operation.

We claim:

1. A grid plate for a lead storage battery including generally parallel, vertically extending grid rods and a current take-off connector positioned adjacent the upper ends of said rods, and characterized in that at least some of said rods have the portions farthest from the take-off connector formed as half rods and the portions closest to the connector as whole rods.

2. The grid plate of claim 1 having a pole bridge and having transitions between whole and half rods positioned along parabolic curves which are open toward the bottom of the plate and which have apices located vertically beneath the pole bridge, said rods being in the form of half rods from said transitions down to the bottom of the plate.

3. A grid plate according to claim 2, characterized in that
those whole rods whose transitions to half rods lie along a given parabolic curve make said transition alternately into half rods laterally displaced with respect to each other,
adjacent transitions lying along the same parabolic curve are uniformly displaced from each other in a horizontal direction, and
transitions in adjacent whole rods lying along successively higher parabolic curves are displaced consecutively by one grid compartment in the direction of the apices of the parabolic curves.

4. A grid plate according to claim 1, characterized in that the width of at least some whole rods diminishes starting from the upper edge of the plate over at least one grid compartment.

5. A grid plate according to claim 1, further comprising a plurality of rods extending diagonally from the upper plate edge to the side edge of the plate, and connecting intersections of grid compartments.

6. A grid plate according to claim 5, wherein the thickness of said diagonal rods diminishes starting from the upper plate edge.

7. A grid plate according to claim 1 having plate rests and wherein the rods which lie above the plate rests are in the form of whole rods throughout their lengths.

8. A grid plate according to claim 1, having a plate frame which includes an upper plate edge and side members and having a plate lug located in the middle of the upper plate edge, and wherein the cross-sections of the side members of the plate frame diminish from top to bottom.

9. A grid plate according to claim 1, having a plate frame which includes an upper plate edge and side members and having a plate lug located near one side member of the frame and wherein the cross-section of that side member diminishes from top to bottom.

10. A grid plate according to claim 9, wherein the horizontal grid rods have portions diminishing in thickness starting from said frame side member of diminishing thickness.

11. A grid plate for a lead storage battery including generally parallel, vertically extending grid rods, and characterized in that at least some of said rods are formed partly as half rods located on only one side of a plane parallel to the grid surface and partly as whole rods located on both sides of said plane.

12. The plate of claim 11 wherein at least some adjacent half rods are located on opposite sides of the plane.

13. The plate of claim 11 wherein the whole rods are generally diamond shaped.

14. The plate of claim 13 wherein the half rods are generally triangular with the base of the triangle adjacent the plane.

* * * * *